United States Patent [19]

Takahashi et al.

[11] Patent Number: 5,108,812
[45] Date of Patent: Apr. 28, 1992

[54] SUBSTRATE FOR A MAGNETIC DISK AND PROCESS FOR ITS PRODUCTION

[76] Inventors: Toshiro Takahashi, 350-29, Ose-cho, Hamamatsu-shi, Shizuoka-ken; Noboru Tsuya, 3-13-11, Hachimanyama, Setagaya-ku, Tokyo; Tadao Tokushima, 1-18-1, Izumi, Hamamatsu-shi, Shizuoka-ken, all of Japan

[21] Appl. No.: 408,385

[22] Filed: Sep. 18, 1989

[51] Int. Cl.$^5$ .................. B32B 3/00; C25D 5/00
[52] U.S. Cl. .................. 428/141; 205/203; 205/222; 428/156; 428/167; 428/172; 428/195; 428/209; 428/472.2; 428/548; 428/550; 428/457; 428/469; 428/600; 428/601; 428/613; 428/615; 428/650; 428/687; 428/699; 428/702; 428/900; 428/64; 427/250; 427/261; 427/304; 427/443.1; 204/192.1

[58] Field of Search .................. 204/14.1, 29, 33, 35.1, 204/38.1, 38.4, 58, 192.1; 428/156, 472.2, 172, 409, 472.3, 141, 167, 195, 209, 548, 550, 600, 601, 613, 615, 687, 457, 469, 472.2, 900, 699, 702, 640, 650, 65, 137, 64; 427/304, 127, 250, 261, 327, 328, 436, 443.1

[56] References Cited

U.S. PATENT DOCUMENTS

4,650,708 3/1987 Takahashi .................. 428/216
4,876,117 10/1989 Bornstein .................. 428/900

Primary Examiner—Ellis P. Robinson
Assistant Examiner—Donald J. Loney
Attorney, Agent, or Firm—Oblon, Spivak, McClelland, Maier & Neustadt

[57] ABSTRACT

A substrate for a magnetic disk, having fine roughness formed on its surface by subjecting aluminum or an aluminum alloy to anodic oxidation, packing pores in the anodized layer thereby formed, with a material different in the physicochemical properties from the anodized layer, and letting a plating material grow selectively by an epitaxial method.

10 Claims, 10 Drawing Sheets

SUBSTRATE FOR A MAGNETIC DISK AND PROCESS FOR ITS PRODUCTION

BACKGROUND OF THE INVENTION

1. Field of the Invention

The present invention relates to a substrate for a magnetic disk useful for a hard disc or a flexible disk. More particularly, it relates to a substrate for a magnetic disk wherein a continuous thin metal layer is used and a process for its production.

2. Discussion of Background

A magnetic recording medium wherein a thin magnetic metal film of e.g. a Co-Cr alloy or a Co-Ni alloy is used, is expected to be a medium having a high recording density by virtue of its high saturation magnetic density and surface smoothness. Various studies are being made for its practical application. In particular, Co-Cr having vertical magnetic recording characteristics has been developed to have a linear recording density as high as 200 KBPI. Further, it has also been reported that Co-Ni provides a linear recording density of 70 KBPI when used as a horizontal magnetic recording medium of a thin film at a level of 500 Å.

Both of the above-mentioned recording media are far superior to presently widely used $\gamma$-$Fe_2O_3$ coating type media having a linear recording density of from 15 to 20 KBPI.

However, continuous thin film media having such excellent magnetic recording characteristics have not yet been widely practically used. One of the factors which hinder the practical application, is a problem in the sliding characteristics between the magnetic head and the medium.

Namely, a continuous thin metal film medium has a smooth surface, whereby, in the case of a hard disk, magnetic head crash is likely to take place due to sticking of the medium to the magnetic head, and in the case of a flexible disk, magnetic head crash is likely to take place due to an increase of the friction coefficient for the sliding operation because of a difficulty in maintaining a lubricant.

Figure 13:
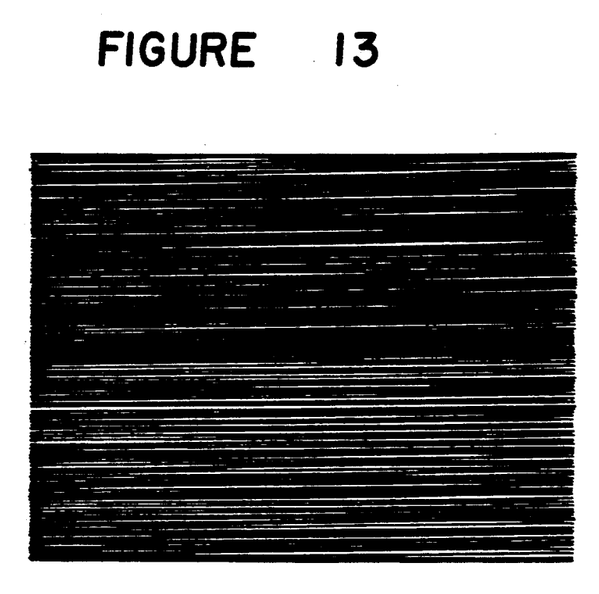
FIG. 13 is a differential interference microscopic photograph showing the metal surface texture of the substrate formed by conventional mechanical texture treatment.
Figure 14:
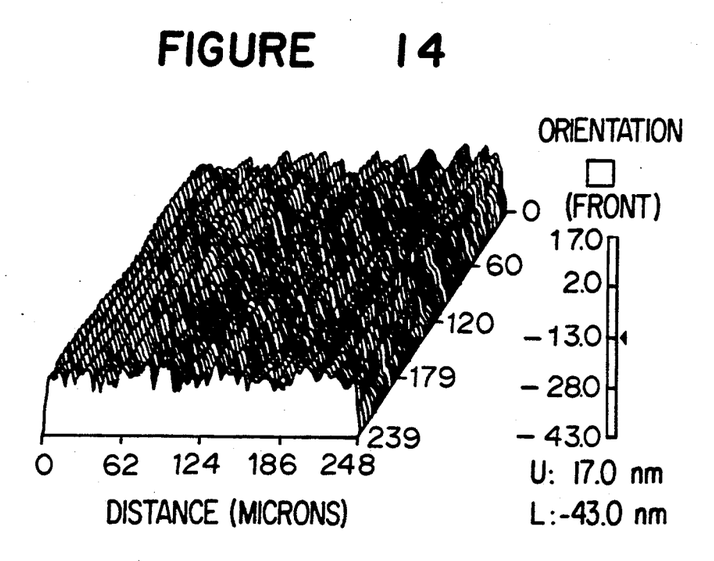
FIG. 14 is an enlarged perspective view of the surface texture of the same substrate as measured by a laser interference type roughness meter.

In order to solve such problems, it has been attempted to apply mechanical texture treatment i.e. surface treatment to form scratch marks of linear groove shape on the substrate surface by means of sandpaper or the like. FIG. 13 is a differential interference microscopic photograph (400 magnifications) of the surface texture of the substrate after the mechanical texture treatment. FIG. 14 is an enlarged perspective view of a portion of 248×248 $\mu$m of the same texture as measured by a laser interference type roughness meter.

Such mechanical texture treatment is effective to some extent. However, in a medium wherein a high recording density is required, bit errors tend to increase depending upon the density and the depth of the texture (linear grooves), and it is difficult to control such density and depth at a mass production level. Namely, when the track width of the magnetic recording is narrow at a level of from 10 to 20 $\mu$m, the width of the texture is required to be 1/10 of the track width. Otherwise, the modulation (the variation in the reproduction output when the recording current is varied) tends to exceed 10%. On the other hand, if the depth of the texture exceeds 200 Å, the head output tends to decrease by at least 10%, whereby the modulation increases.

Even when a texture satisfying such requirements were obtained, if the number of grooves per unit area is small, a problem of sticking would be likely to result since the sliding area of the magnetic head is as large as 0.5 mm×4 mm.

Further, due to irregular roughness such Agnail formed by mechanical texture treatment, the distance between the head and the magnetic recording medium can not adequately be reduced, whereby it is difficult to increase the recording density because of the spacing loss. Especially in the case of a hard disk, irregular roughness produces a dust during the CSS operation, which in turn adheres to the head and the medium to cause head crash.

To solve the above problems, the present inventors have proposed in U.S. patent application Ser. No. 07/356,873 a substrate for obtaining a magnetic disk having sliding characteristics free from magnetic head crash by packing pores of anodized aluminum with a material different in the physicochemical properties from the anodized aluminum on the basis of the regularity of pores of anodized aluminum i.e. the pore diameters and pores distances (cell diameters) being very small and the pore distribution being uniform, and subjecting it to etching treatment by utilizing the difference in the physicochemical properties between the anodized aluminum and the packing material, to form uniform two-dimensional fine roughness on the substrate surface, and a process for its production.

SUMMARY OF INVENTION

It is an object of the present invention to provide a substrate for obtaining a magnetic disk having sliding characteristics free from magnetic head crash by forming uniform two-dimensional fine roughness on the substrate surface by a method which is different from the above-mentioned earlier invention disclosed in U.S. patent application Ser. No. 07/356,873 by utilizing the regularity of pores of anodized aluminum and the difference in the physicochemical properties between the anodized aluminum and the packing material, and to provide a process for its production.

According to the first aspect, the present invention provides a substrate for a magnetic disk, having fine roughness formed on its surface by subjecting aluminum or an aluminum alloy to anodic oxidation, packing pores in the anodized layer thereby formed, with a material different in the physicochemical properties from the anodized layer, and letting a plating material grow selectively by an epitaxial method.

According to the second aspect, the present invention provides a process for producing a substrate for a magnetic disk, having fine roughness formed on its surface, which comprises:

a) a first step of subjecting aluminum or an aluminum alloy to anodic oxidation, b) a second step of packing pores in the anodized layer formed by the first step, with a material different in the physicochemical properties from the anodized layer, c) a third step of polishing the surface of the substrate obtained in the second step to make its surface smooth, and d) a fourth step of letting a plating material grow selectively by an epitaxial method on the surface of the substrate obtained in the third step.

BRIEF DESCRIPTION OF THE DRAWINGS

FIG. 1A illustrates the state after packing the pores followed by polishing. FIG. 1B illustrates the surface after the epitaxial treatment.

FIGS. 6 and 7 are graphs showing the changes of the friction coefficients due to the environmental conditions.

FIGS. 8A to 8C illustrate the record reproducing characteristics of the magnetic disk of Example 1.

FIGS. 11 and 12 show the results of sliding tests. FIG. 11 shows the test results conducted on a magnetic disk using a substrate having pores packed with copper and having the copper protruded on its surface.

DETAILED DESCRIPTION OF THE PREFERRED EMBODIMENTS

The disk substrate according to the first aspect of the invention is prepared by packing pores of an anodized layer of aluminum or an aluminum alloy with a material different in the physicochemical properties from the anodized aluminum and epitaxially treating the packed anodized aluminum to form fine roughness on its surface based on the difference in the physicochemical properties between the anodized aluminum and the packing material.

Accordingly, the diameters and the distances of recesses and protuberances constituting the roughness correspond substantially to the diameters and distances of the pores of the anodized aluminum, and therefore the distribution is very uniform, and it is possible to obtain a suitable friction coefficient to the magnetic head by properly adjusting the depth of recesses or height of the protuberances, whereby it is possible to provide a magnetic disk having sliding characteristics free from magnetic head crash.

According to the second aspect of the invention, pores of porous anodized aluminum substrate will be packed with a material different in the physical and chemical properties from the substrate, such as Cu, Sn, Ni, Zn, NiO, a resin or Ni-Sn, by precipitation or penetration, by electrodeposition treatment or coating treatment utilizing heating and cooling, or in the case where pore diameters are large, by sputtering treatment. In this case, the packing material may not necessarily be packed to the bottoms of the pores. An optional material may be used in the case of sputtering treatment or coating treatment. In the case of an organic coating material containing an oxide powder, the coating material may be subjected to reducing treatment after coating to precipitate the metal (known from IBM Technical Disclosure Bulletin Vol. 11, No. 3, August 1968 issue). The pore diameters and the cell diameters can optionally be controlled within the ranges of from 100 to 400 Å and from 400 to 2,000 Å, respectively, by adjusting the anodizing treatment voltage and the pore dissolving treatment conditions.

After completion of the packing treatment, the substrate is then polished to make the surface smooth, and then a plating material is permitted to grow on its surface by an epitaxial method. The growth of the plating material proceeds selectively due to the difference in the physicochemical properties between the anodized aluminum and the packing material. Namely, there will be a difference in growth as between the anodized aluminum portion and the packed material portion, whereby a texture of regular two-dimensional fine roughness attributable to the uniform distribution of pores will be formed.

For the epitaxial method, a chemical vapor deposition method, an electroless plating method or a sputtering method may be employed.

Depending upon the type of the material packed into pores, the substrate surface may sometimes be soft. In such a case, according to the method of the present invention, a plating material is grown on the surface of the anodized aluminum and the packing material by the epitaxial method, and a hard film may be coated depending upon the type of the plating material, whereby the surface hardening effect can be obtained.

On the surface of the substrate thus prepared, a magnetic material is applied by sputtering treatment or by plating, and then a protecting layer is coated thereon, to obtain a magnetic recording medium having a two-dimensional texture on its surface.

A liquid lubricant may be applied to the roughened portion of the surface, as the case requires.

As described in the foregoing, according to the process of the present invention, the roughness is formed by taking advantage of the difference in growth rate of the plating material by the epitaxial method utilizing the difference in the physicochemical properties between the substrate and the material packed in the pores of the anodized aluminum substrate, whereby uniform distribution of roughness can easily be obtained, and mass production of disk substrates having uniform quality will be possible. By the application of a magnetic material to the surface of this substrate, it is possible to avoid a problem of bit errors due to the texture treatment.

Now, the present invention will be described in further detail with reference to Examples. However, it should be understood that the present invention is by no means restricted by these specific Examples.

EXAMPLE 1

(By means of chemical vapor deposition method)

Figure 1A:
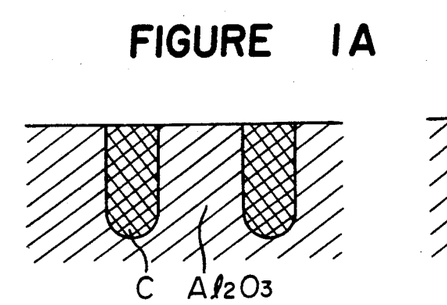
FIGS. 1A and 1B are enlarged cross sectional views diagrammatically illustrating the surface structures of the substrate in Example 1 according to the process of the present invention.

An Al-4% Mg alloy plate was subjected to anodic oxidation treatment in a 3% oxalic acid bath at an applied voltage of 50 V to form an anodized aluminum coating layer having a thickness of 10 μm, a cell diameter of 1,200 Å and a pore diameter of 400 Å. Then, this substrate was dipped in a 1% $H_3PO_4$ bath for 60 minutes for pore enlarging treatment to bring the pore diameter to 800 Å. Then, carbon powder (C) was packed into the pores, and the surface was polished by means of an alumina powder having a particle size of 0.8 μm until the average roughness (RA) became 14 Å to make the surface smooth. FIG. 1A diagrammatically illustrates this state.

Figure 1B:
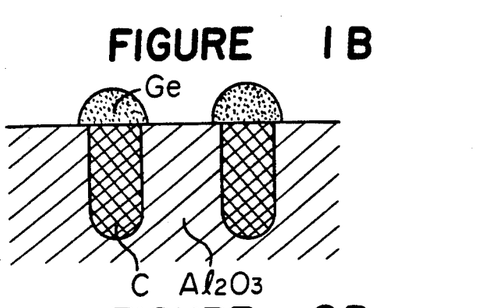

Then, epitaxial treatment was conducted by a chemical vapor deposition method by means of a carbon dioxide gas laser. Namely, by using an argon gas of 1 atm containing 4% by volume of $Ge(CH_3)_4$ as the reaction gas, the above substrate was heated at 150° C., and a carbon dioxide gas layer having a wavelength of 10.6 μm was irradiated with an output of 10 W for 10 minutes, whereby Ge precipitated and grew only on the pore diameters, and the height became 100 Å. FIG. 1B diagrammatically illustrates this state.

EXAMPLE 2

(By means of chemical vapor deposition)

An Al-4% Mg alloy plate was subjected to anodic oxidation treatment in a 3% oxalic acid bath at an applied voltage of 50 V to form an anodized aluminum coating layer having a thickness of 10 μm, a cell diameter of 1,200 Å and a pore diameter of 400 Å. Then, this substrate was dipped in a 1% $H_3PO_4$ bath for 50 minutes for pore enlarging treatment to bring the pore diameter to 750 Å.

Figures 2A, 2B:
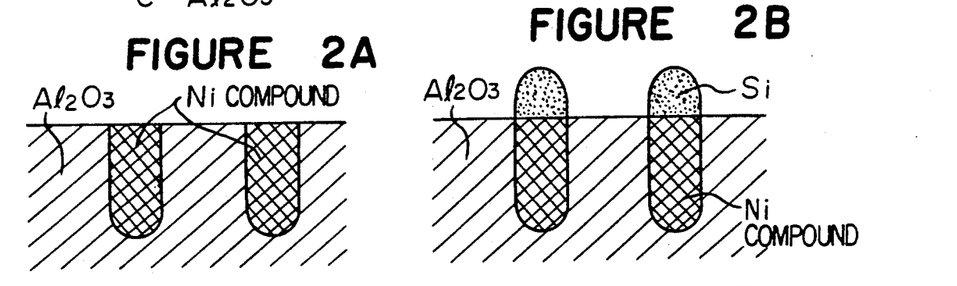
FIGS. 2A and 2B, FIGS. 3A and 3B and FIGS. 4A and 4B are enlarged cross sectional views corresponding to FIGS. 1A and 1B, respectively, but illustrate other Examples, respectively.

Then, a kneaded mixture comprising 400 g of $NiCl_2$, 200 g of CuCl and 1,000 cc of $H_2O$ was coated on the surface of the anodized aluminum surface and reduced with $H_2$ at 450° C. to pack the Ni compound in the pores. Then, the surface was polished by means of an alumina powder having a particle size of 0.8 μm until RA became 14 Å to make the surface smooth (see FIG. 2A).

Then, epitaxial treatment was conducted by a chemical vapor deposition method using an argon gas laser. Namely, by using an argon gas of 1 atm containing 1% by volume of $Si_2H_6$, the substrate was heated at 200° C., and an argon gas laser having a wavelength of 6,470 Å was irradiated with an output of 10 W for 10 minutes to precipitate only a Si compound only on the pore diameters in a height of 200 Å (see FIG. 2B).

EXAMPLE 3

(By means of sputtering)

An Al-4% Mg alloy plate was subjected to anodic oxidation treatment in a 3% oxalic acid bath at an applied voltage of 50 V to form an anodized aluminum coating layer having a thickness of 10 μm, a cell diameter of 1,200 Å and a pore diameter of 400 Å. Then, this substrate was immersed in a solution containing 30 g/l of $SnSO_4$ for electrolytic precipitation treatment to electrically precipitate Sn in the pores.

Figures 3A, 3B:
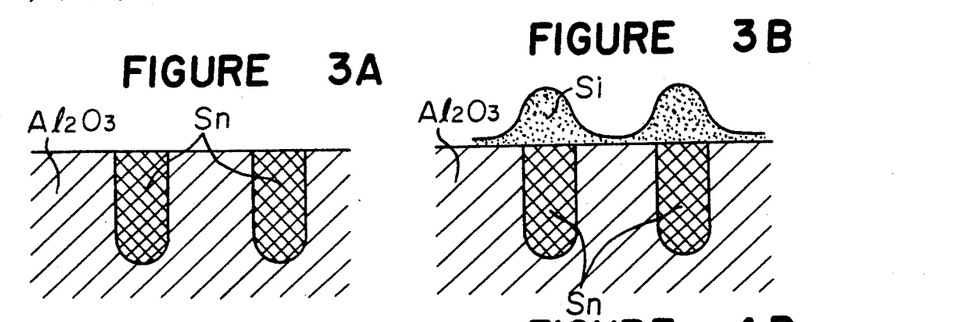

Then, this substrate was polished by using a solution of pH 8.0 containing $Al_2O_3$ having an average particle size of 0.3 μm and $SiO_2$ having an average particle size of 80 Å until RA became 14 Å. FIG. 3A diagrammatically illustrates this state.

To this substrate, reactive sputtering treatment was applied for 10 minutes by using an argon gas containing 10% by volume of $SiH_2$ as the sputtering gas under a gas pressure of $10^{-2}$ torr and by using Si as the target material, whereby fine roughness was formed on the surface since the deposition efficiency of the target material Si is different as between against Sn in the pores and against the anodized aluminum ($AlO_3$) of the substrate. The height of the roughness was 200 Å. FIG. 3B diagrammatically illustrates this state.

Depending upon the type of the material packed in the pores, the surface may become soft. However, as shown in FIG. 3B, the target material deposits on the surface of both the anodized aluminum and the packed material, whereby a hard film may be coated on the substrate surface depending upon the type of the target material to provide a surface hardening effect.

EXAMPLE 4

(By means of electroless plating)

An Al-4% Mg alloy plate was subjected to anodic oxidation treatment in a 3% oxalic acid bath at an applied voltage of 50 V to form an anodized aluminum coating layer having a thickness of 10 μm, a cell diameter of 1,200 Å and a pore diameter of 400 Å. Then, a kneaded mixture comprising 400 g of $NiCl_2$, 200 g of CuCl and 1,000 cc of $H_2O$, was coated on the surface of the anodized aluminum and reduced with $H_2$ at 450° C. to pack a Ni compound in the pores. Then, the surface was polished by means of an alumina powder until RA became 14 Å, to make the surface smooth (see FIG. 4A).

Then, to the above substrate, electroless plating was applied under the following plating conditions:
 (a) plating material: Ni-P,
 (b) bath components:
  nickel sulfate: 20 g/l,
  sodium hypophosphite: 25 g/l,
  lactic acid: 25 g/l,
  propionic acid: 3 g/l,
 (c) pH: 4.5
 (d) temperature: 90° C.
 (e) treating time: 30 seconds.

Figures 4A, 4B:
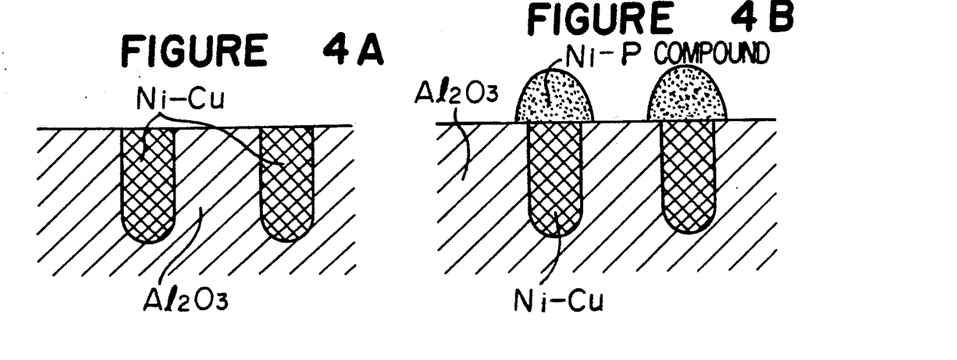

As a result, the plating material Ni-P grew on the packing material Ni-Cu in a height of 200 Å to form uniform fine roughness on the substrate surface, as diagrammatically illustrated in FIG. 4B.

A magnetic material was coated by sputtering on the surface of each substrate having fine roughness on its surface obtained in each of the above Examples, to obtain a magnetic disk. The coating conditions of the magnetic material were different to some extent depending upon the type of the material packed in the pores of the substrate (C, a Ni compound, a Si compound, Sn, Ni-Cu). However, the coating was conducted substantially under the following conditions:
 Substrate temperature: 100°–150° C.
 Undercoating layer: Cr 1,000–1,200 Å
 Magnetic layer: Co-Ni 600 Å
 Protective layer: C 200 Å

Each magnetic disk thus obtained was subjected to the following various tests.

TEST I

(Friction coefficient)

Figure 5:
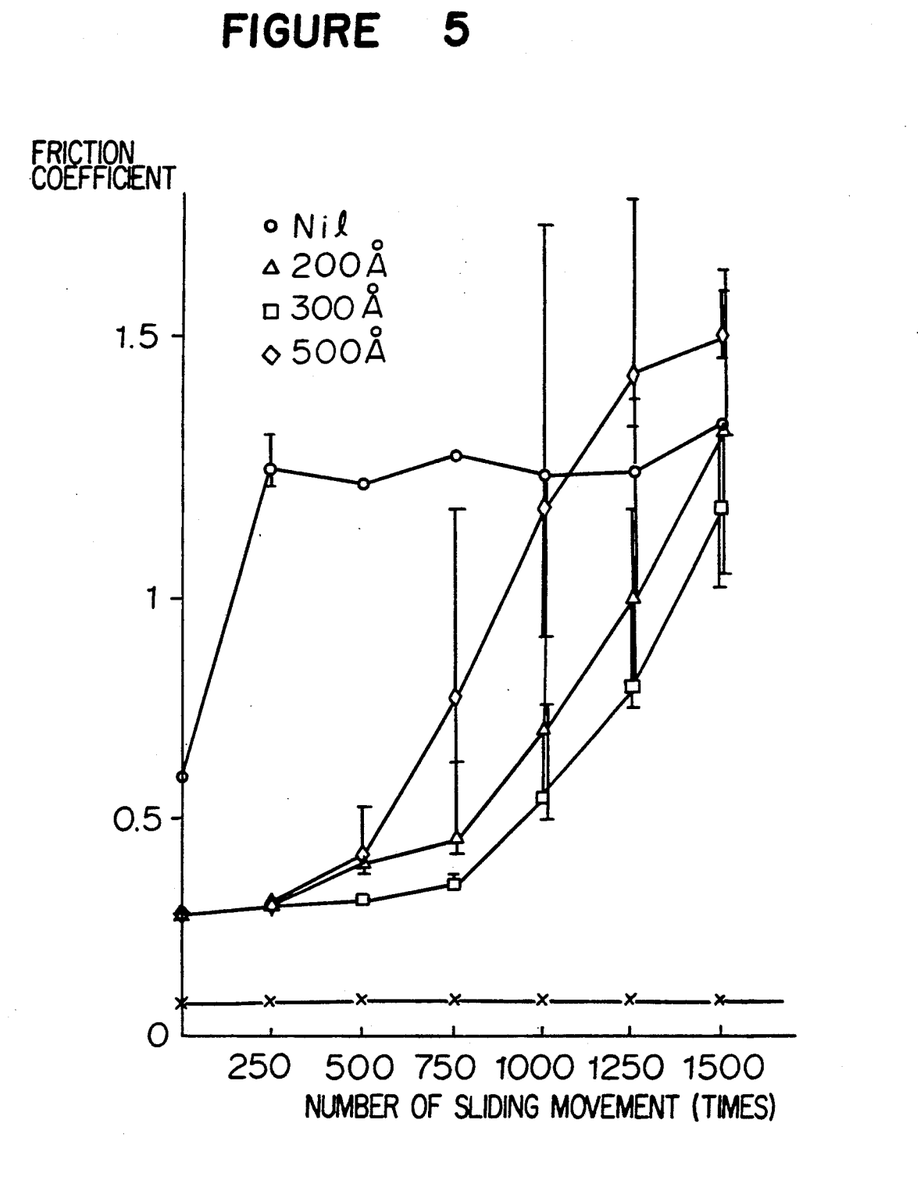
FIG. 5 is a graph showing the relation between the depth of roughness and the friction coefficient with respect to various substrate surfaces.

The relation between the depth of the roughness of the magnetic disk and the friction coefficient was investigated, and the results were as shown in FIG. 5.

The weight of the magnetic head used for the measurement was 15 g, and the running speed was 0.2 m/sec. In FIG. 5, symbol △ indicates the data of the substrate with a depth of roughness of 200 Å, symbol □ indicates the data of the substrate with a depth of roughness of 300 Å, and symbol ◇ indicates the data for the substrate with a depth of roughness of 500 Å. The substrate with a depth of roughness of 100 Å showed the same results as the substrate with a depth of roughness of 200 Å. In the same Figure, the data for the substrate which was not treated by epitaxial treatment i.e. the one having roughness formed by etching conducted simultaneously with the polishing with an alkaline or acidic polishing solution used for polishing treatment, are identified with symbol ○ for comparison. Further, symbol X indicates the case of the substrate with a depth of roughness of 200 Å having a liquid lubricant maintained on its surface. The test results indicate that the depth of roughness showing a friction coefficient within an acceptable range is within a range of from 50 to 5,000 Å. According to the present invention, a substrate with a depth of roughness within a range of from 50 to 500 Å can readily be prepared.

TEST II

(Environmental test)

Further, with respect to each of the above magnetic disks, the change in the friction coefficient due to the environmental conditions was measured by a high humidity test and a high temperature running test.

Figure 6:
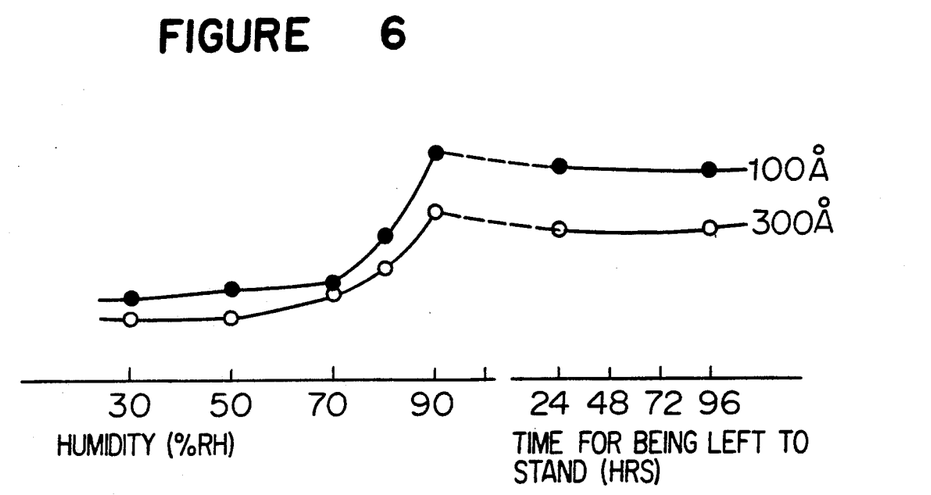
FIG. 6 shows the results of a high humidity test.
Figure 7:
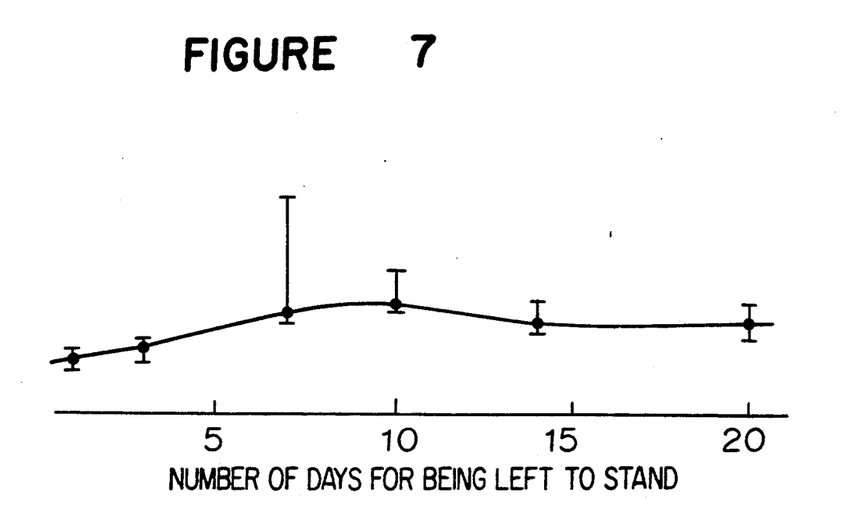
FIG. 7 shows the results of a high temperature rotation test.

For the high humidity test, a carbon coating of 200 Å was applied on the surface of each magnetic disk, and two types of substrates i.e. having a depth of roughness of 100 Å and 300 Å, respectively, were employed. The test results were as shown in FIG. 6. The change in the friction coefficient is very small under usual practical conditions. The high temperature running test was conducted by using a magnetic disk having a depth of roughness of 200 Å and provided with a carbon coating having a thickness of 200 Å, at a temperature of 80° C. and at a rotational speed of 3,600 rpm. The test results were as shown in FIG. 7. Irrespective of the number of days left to stand, the friction coefficient is found to be very stable at a low value.

TEST III

(Record reproducing characteristics test)

Figure 8A:
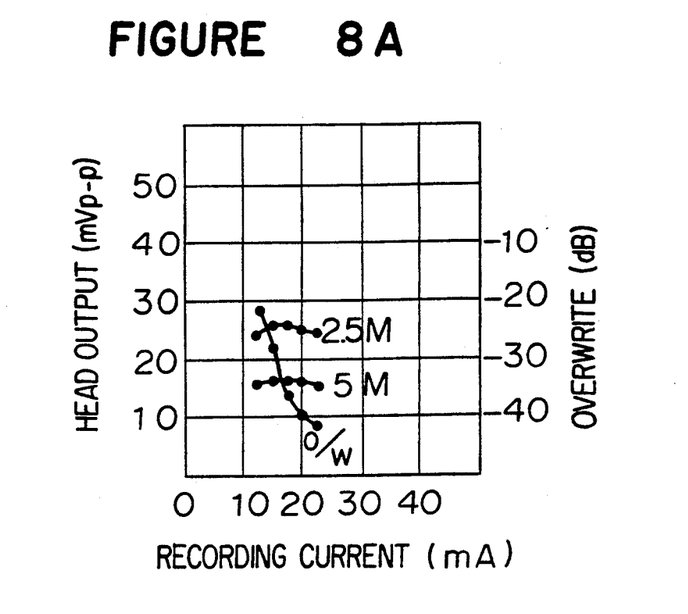
FIG. 8A is a graph showing the record reproducing characteristics.
Figure 8B:
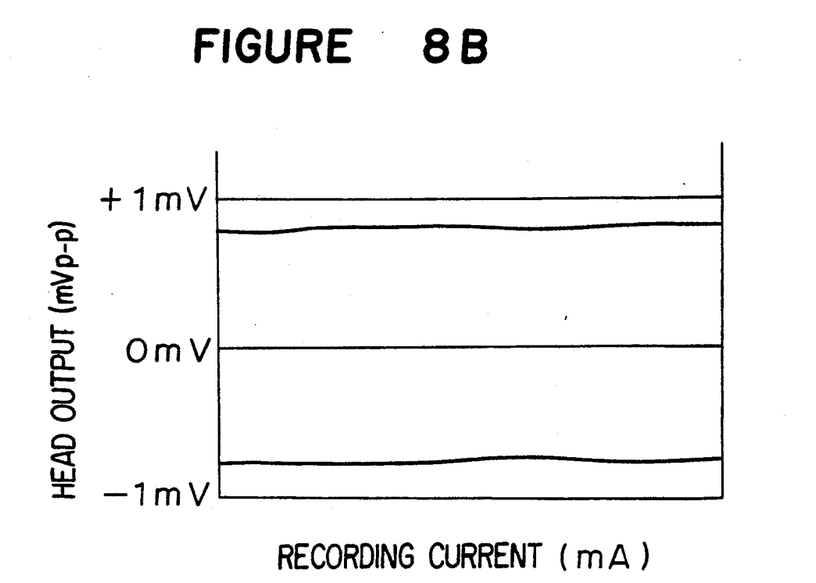
FIG. 8B is a graph showing the output wave shape.
Figure 8C:
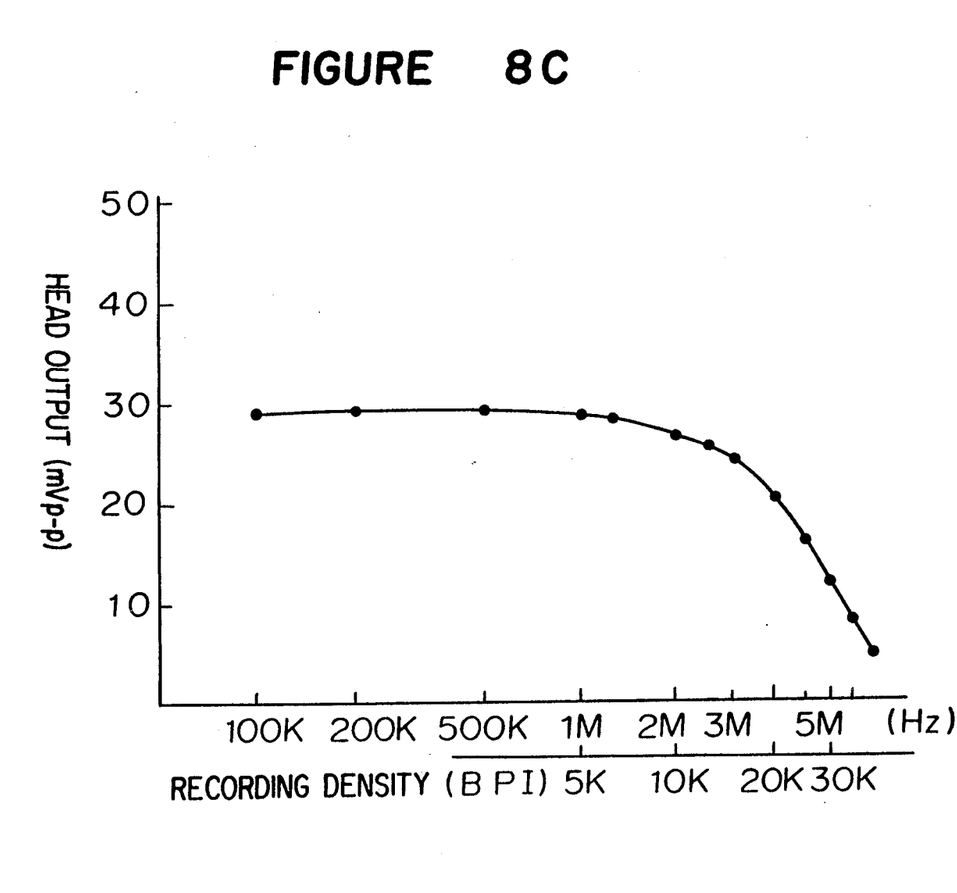
FIG. 8C is a graph showing the frequency characteristics.

Further, with respect to the magnetic recording medium obtained in each of the above Examples, a record reproducing characteristics test was conducted. FIGS. 8A to 8C show the results of measurements when a Mn-Zn monolithic magnetic head (product No. M556 manufactured by Matsushita Electric Co., Ltd.) was used for the magnetic disk of Example 2 (packing material: Ni compound, magnetic material: horizontally magnetized film of Co-Ni) (head gap 0.5 μm, track width: 15 μm, flying height: 0.1 μm).

FIG. 8A is a graph of record reproducing characteristics showing the relation between the electric current applied to the magnetic head at the time of recording on the above magnetic medium at 2.5 MHz and 5 MHz, respectively, and the output voltage obtained at the magnetic head at the time of the reproduction of the magnetic medium, and the attenuation of the output at the time of overwriting. At each recording wavelength, a constant head output is obtainable irrespective of the recording current.

FIG. 8B is a graph of the output waveform showing the changes of the maximum value and the minimum value of the head output.

FIG. 8C is a graph of the frequency characteristics showing the relation of the head output to the recording frequency. The output value is substantially constant from 100 KHz to 2 MHz. Even at 5 MHz, an output of about 20 mV is obtainable. The numerals in the column for the recording density represent the recording densities corresponding to the frequencies given thereabove, respectively.

Figure 9A:
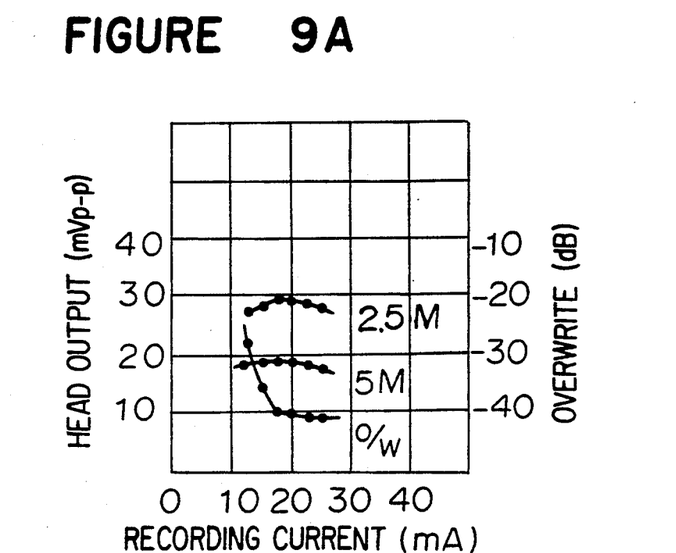
FIGS. 9A to 9C are graphs showing similar record reproducing characteristics of a magnetic disk according to another Example.
Figure 9B:
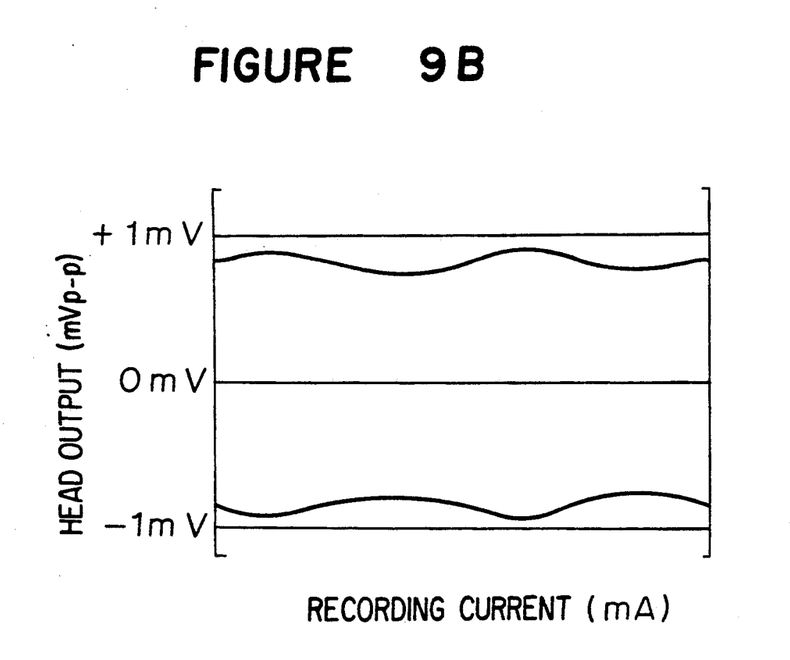
Figure 9C:
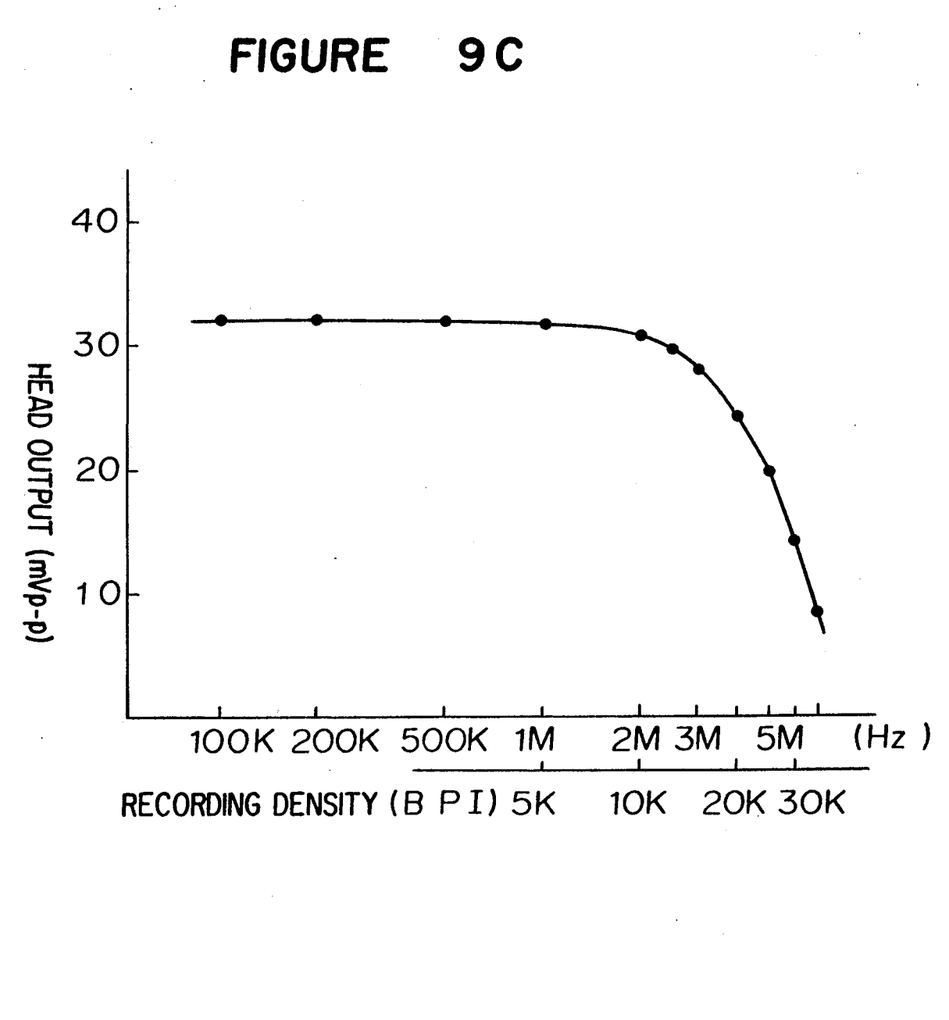

FIGS. 9A to 9C correspond to FIGS. 8A to 8C, respectively, in a case where the measurement was conducted under the same conditions by using the magnetic head of product No. M515 against the magnetic disk of Example 3 (packing material: Sn, magnetic material: Co-Ni).

As is evident from the comparison of FIGS. 9B and 8B, when Ni is used as the packing material and a horizontal magnetic layer of Co-Ni or Co-Cr is used as the magnetic material, and the magnetic coupling between upper and lower layer is weakened, the head output decreases to some extent, but no substantial change (modulation) is observed in the head output irrespective of the level of the recording current, and a high level of stability is attained. This is believed to be attributable to the interaction between the vertical magnetic layer constituting the underlayer of the substrate and the horizontal magnetic layer constituting the upper layer.

TEST IV

(Signal-to-noise test)

Figure 10A:
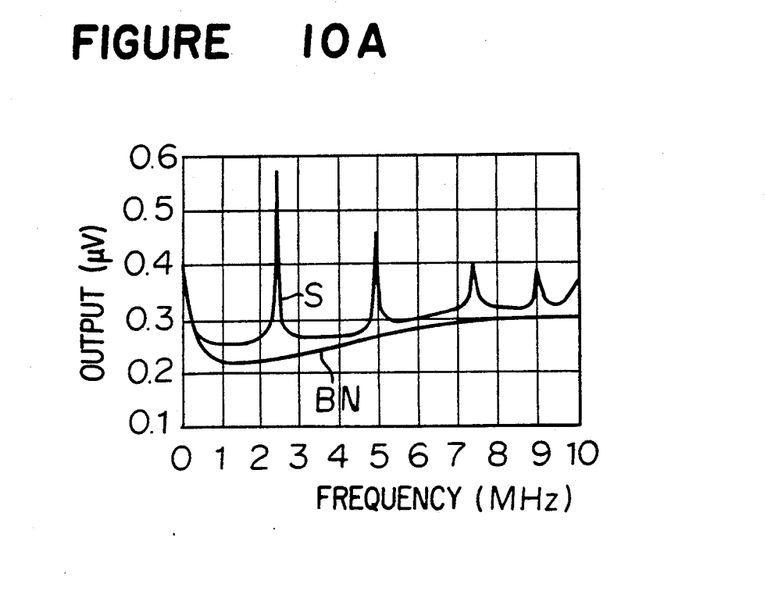
FIGS. 10A and 10B are graphs showing the results of the signal-to-noise tests of the magnetic disk of the present invention and a conventional product, respectively.
Figure 10B:
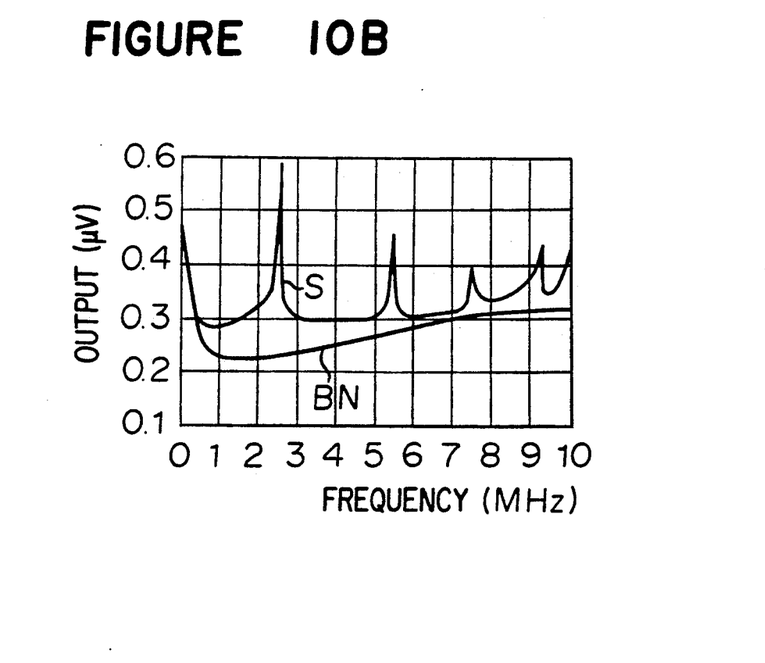

Further, the signal-to-noise test results of the magnetic disk obtained by the epitaxial texturing method of the present invention, were compared with the signal-to-noise test results of the magnetic disk obtained by the conventional mechanical texturing method. FIG. 10A represents the test results of the magnetic disk according to the present invention, and FIG. 10B represents the test results of the conventional product. In the Figures, line BN indicates the background noise of the test apparatus, and line S indicates the signal. The area between BN and S represent the size of the noise. Therefore, it is evident that when the magnetic disk substrate according to the present invention is used, the noise can be reduced by about one half as compared with the conventional product.

When the epitaxial method is employed, the material packed in the pores is different from the material formed thereon. Therefore, when a material having a reducing property is used as the material to be epitaxially formed, it is possible to block oxygen generated from the anodized aluminum layer during sputtering of a continuous magnetic layer on the substrate, whereby it is possible to obtain a magnetic layer and a protective layer of high quality. As such a reducing epitaxial material, Sn, Zn, Ti, Mg, Be, Bi or Al may be used.

Figure 12:
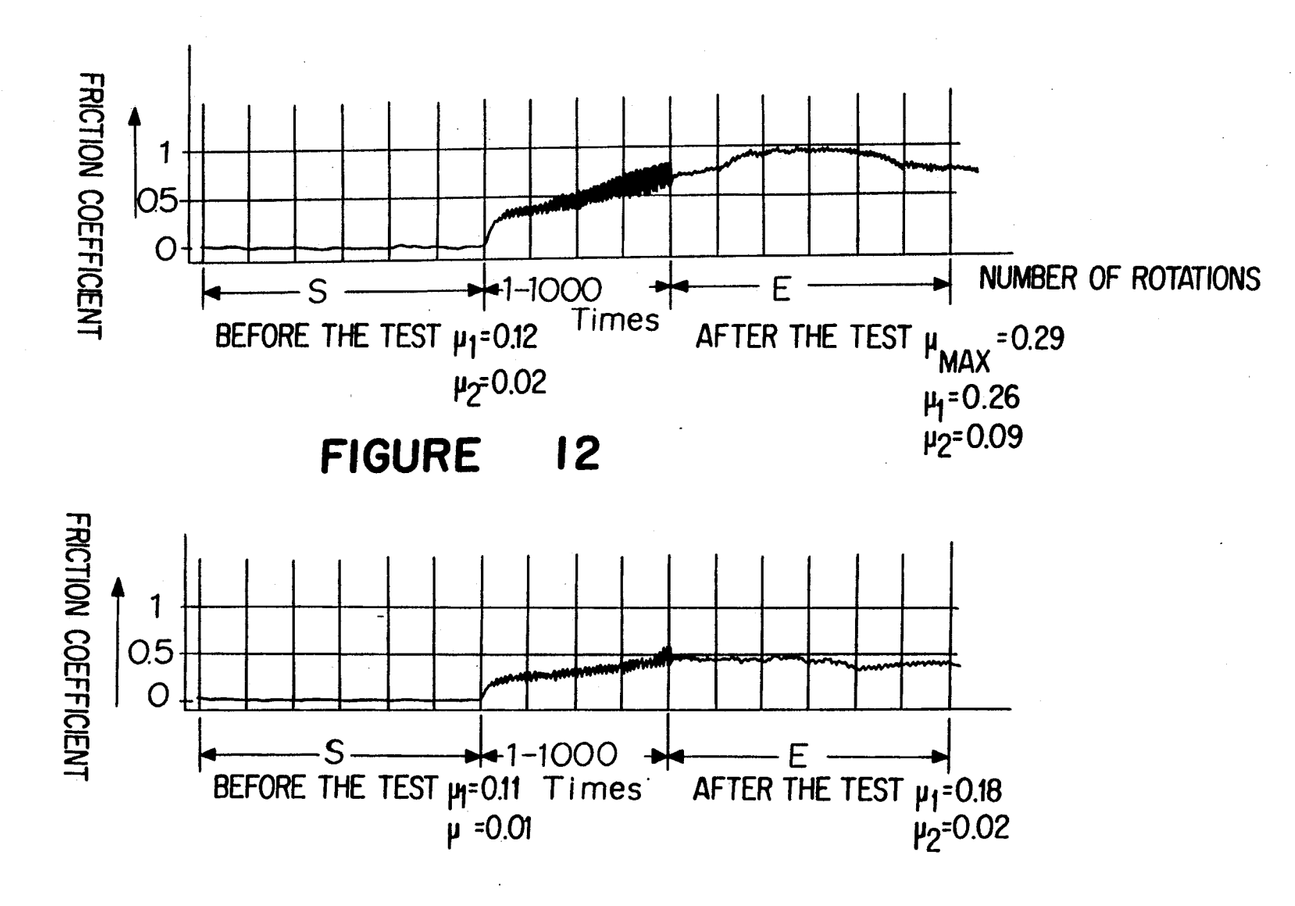
FIG. 12 shows the test results conducted on a magnetic disk using a substrate having pores packed with copper and having tin deposited on the copper as a reducing epitaxial material.

FIGS. 11 and 12 show the results of 1,000 times sliding tests conducted against a magnetic disk using a substrate having Cu packed in pores and having the Cu protruded on the surface and against a magnetic disk using a substrate having Cu packed in pores and having Sn formed on the Cu, as a reducing epitaxial material. The magnetic head used was Mn-Zn monolithic and had ABS 400 μm and a weight of 15 g. As the friction coefficient tested, the static friction coefficient $\mu_1$ and the dynamic friction coefficient $\mu_2$ were investigated.

In each Figure, the ranges of S and E represent one rotation of the disk before and after the test, respectively, and the test range of from 1 to 1,000 times is represented on a reduced scale.

As is evident from the comparison of the two Figures, the magnetic disk using the substrate having Sn epitaxially formed, has lower values for both $\mu_1$ and $\mu_2$ and has a lower modulation.

From the results of the above-mentioned various tests on various materials, the following conclusion was obtained.

Namely, it is possible to obtain regular two-dimensional roughness by epitaxial treatment as a chemical texture treatment by packing pores of anodized aluminum with a material different in the physicochemical properties from the anodized aluminum and forming fine roughness on its surface by utilizing the difference in the physicochemical properties in the same manner as in the case of etching treatment, and it is thereby possible to present a magnetic disk having the desired sliding characteristics and having an excellent signal to noise ratio.

Thus, the practical and industrial effects of the present invention on the magnetic recording medium are significant.

What is claimed is:

1. A substrate for a magnetic disk having fine roughness formed in its surface, comprising:
   an anodically oxidized aluminum or aluminum alloy layer having pores;
   a material packed in said pores of said anodized layer having physicochemical properties different from that of said anodized layer; and
   a plating material selectively formed on said anodized layer having said packed pores by an epitaxial method;
   wherein said selectively formed plating material provides said fine surface roughness; and
   said surface roughness corresponding to a distribution of said pores due to a difference in growth rates of said plating material on said material and said anodized layer.

2. A substrate for a magnetic disk according to claim 1, comprising protuberances formed over said pores by said selective formation of said plating material to obtain fine roughness corresponding to a distribution of said pores.

3. A substrate for a magnetic disk according to claim 2, comprising said protuberances having a height which provides a desired coefficient of friction between said surface of said substrate and a magnetic head.

4. A process for producing a substrate for a magnetic disk, having fine roughness formed on its surface, which comprises:
   a first step of subjecting aluminum or an aluminum alloy to anodic oxidation;
   a second step of packing pores in the anodized layer formed by the first step, with a material different in the physicochemical properties from the anodized layer;
   a third step of polishing the surface of the substrate obtained in the second step to make its surface smooth; and
   a fourth step of letting a plating material grow selectively by an epitaxial method on the surface of the substrate obtained in the third step to obtain said fine surface roughness;
   wherein said fourth step comprises selectively growing said plating material such that a growth rate of said plating material on said material is different than a growth rate of said anodized layer to obtain said fine surface roughness corresponding to a distribution of said pores.

5. The process for producing a substrate for a magnetic disk according to claim 4, wherein said fourth step comprises forming protuberances over said pores to obtain said fine surface roughness corresponding to a distribution of said pores.

6. The process for producing a substrate for a magnetic disk according to claim 5, further comprising selecting a height of said protuberances to obtain a desired coefficient of friction between the surface of said substrate and a magnetic head.

7. The process for producing a substrate for a magnetic disk according to claim 4, wherein chemical vapor deposition is used as the epitaxial method.

8. The process for producing a substrate for a magnetic disk according to claim 4, wherein the electroless plating method is used as the epitaxial method.

9. The process for producing a substrate for a magnetic disk according to claim 4, wherein a sputtering method is used as the epitaxial method.

10. The process for producing a substrate for a magnetic disk according to claim 4, wherein a material having a reducing property is used as the plating material.

* * * * *

UNITED STATES PATENT AND TRADEMARK OFFICE
CERTIFICATE OF CORRECTION

PATENT NO. : 5,108,812
DATED : 04/28/92
INVENTOR(S) : TOSHIRO TAKAHASHI ET AL

It is certified that error appears in the above-identified patent and that said Letters Patent is hereby corrected as shown below:

IN THE DRAWINGS:

Sheet 9 of 10, please label the left most figure --Figure 11--.

Signed and Sealed this

Fourth Day of January, 1994

Attest:

BRUCE LEHMAN

*Attesting Officer*   *Commissioner of Patents and Trademarks*